United States Patent
Crawford et al.

(10) Patent No.: US 10,014,898 B2
(45) Date of Patent: Jul. 3, 2018

(54) HOUSING ASSEMBLY

(71) Applicant: MOTOROLA SOLUTIONS, INC, Schaumburg, IL (US)

(72) Inventors: Christopher D. Crawford, Hollywood, FL (US); Jody H. Akens, Weston, FL (US); Charles E. Kline, Plantation, FL (US); Eduardo J Moralejo, Miami, FL (US); Adrian F. Rubio, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/699,795

(22) Filed: Apr. 29, 2015

(65) Prior Publication Data

US 2016/0323001 A1     Nov. 3, 2016

(51) Int. Cl.
*H04B 1/3888* (2015.01)
*H04W 4/10* (2009.01)
*H04B 1/3827* (2015.01)
*H04M 1/02* (2006.01)

(52) U.S. Cl.
CPC ......... *H04B 1/3888* (2013.01); *H04B 1/3833* (2013.01); *H04W 4/10* (2013.01); *H04M 1/0249* (2013.01)

(58) Field of Classification Search
CPC .. H04B 1/3888; H04B 1/3838; H04B 1/3833; H04M 1/0202; H04M 1/185; H04M 1/035; H04M 1/0249; H04W 4/10
USPC ... 455/575.1–575.4, 575.8, 90.2, 90.3, 578.8
See application file for complete search history.

(56) References Cited

U.S. PATENT DOCUMENTS

| | | | | |
|---|---|---|---|---|
| 2007/0003827 A1* | 1/2007 | Zuo | ..................... | H01M 2/1066 429/97 |
| 2008/0174478 A1* | 7/2008 | Whiteside | .............. | H05K 5/061 342/357.57 |
| 2010/0026148 A1* | 2/2010 | Zhang | ...................... | G06F 1/18 312/223.2 |
| 2011/0096472 A1* | 4/2011 | Rodgers | ............. | H04M 1/0252 361/679.01 |
| 2012/0050170 A1* | 3/2012 | Akens | ................... | G06F 1/1662 345/170 |
| 2012/0212890 A1* | 8/2012 | Hoshino | ............. | H04M 1/0202 361/679.01 |
| 2016/0120047 A1* | 4/2016 | Chang | ................. | H05K 5/0221 361/679.01 |

* cited by examiner

*Primary Examiner* — Yuwen Pan
*Assistant Examiner* — Fatuma Sherif
(74) *Attorney, Agent, or Firm* — Barbara R. Doutre

(57) ABSTRACT

A radio housing (100) is formed of a front plate (102) having screw mount receptacles (222, 223, 224, 228, 229, 230) and first and second side plates (104, 106). The first and second side plates (104, 106) have a plurality of non-symmetrical, three-dimensional (3-D), dovetail sections (108, 110, 112, 114) for aligning and capturing the screw mount receptacles (222, 223, 224, 228, 229, 230) of the front plate (102). The front plate (102) and first and second side plates (104, 106) are formed of an injection molded thermoplastic material. The three pieces (102, 104, 106) are coupled together. The three-piece injection housing formed of injunction molded materials allows the housing (100) to be customized to specific customer requests not currently available with past overmolded materials.

37 Claims, 5 Drawing Sheets

HOUSING ASSEMBLY

FIELD OF THE DISCLOSURE

The present disclosure relates generally to housing assemblies for communication devices, and more particularly to housing assemblies for portable radio products.

BACKGROUND

One of the most important aspects of a portable radio is its external housing. In the public safety arena, the external housing must provide ruggedness under a variety of environments, such as firefighting and rescue operations, chemically hazardous surroundings, and harsh weather conditions. The exterior housing must also be easy to assemble and cost effective. Currently most public safety radios utilize a single external radio housing that is injection molded utilizing a two-step over-molding process comprising an injection molded polymer and then an overmolded polymer. The overmolding processes involve very high pressures and high temperatures, and thus the choice of materials for the initial injection molded polymer is limited as not all injection molded polymers can be subjected to overmolding processes. If a unique material property is required, high temperature resistance for example, it is not likely that an overmolded housing can be created for this purpose.

Accordingly, it would be desirable to have an improved housing assembly that provides ruggedness and ease of assembly for the public safety radio market without the use of an overmolded material or process.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
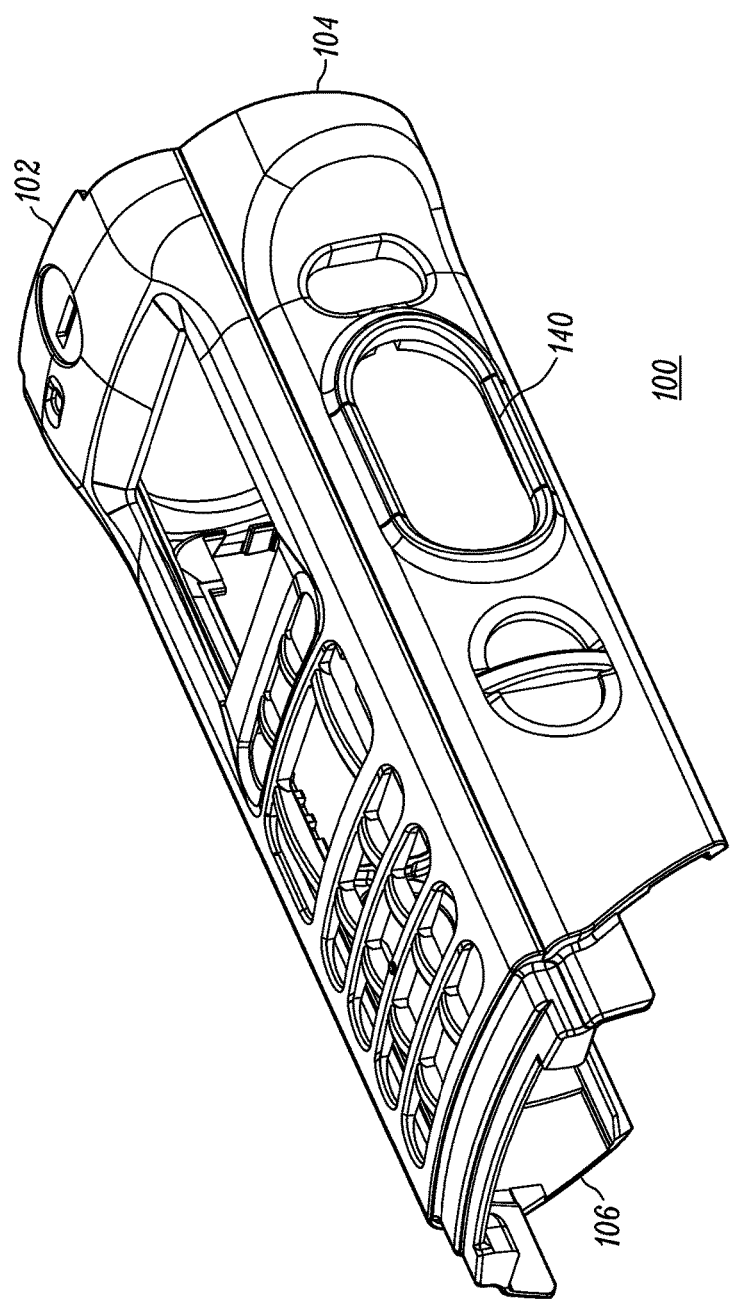
FIG. 1A is a radio housing in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a housing assembly that replaces the current over-molded, one piece, radio housing. The housing design allows for the housing to be molded in three pieces of injection molded material for interlocking and assembly. The housing assembly comprises a front plate and two side plates. The two side plates can be coupled to a radio chassis and then the front plate can be screwed on. The three piece parts are formed such that the front plate and the two side plates can be coupled together (without the chassis) and uncoupled, which allows for verification of design tolerances. The three piece parts are uniquely designed. Each side plate comprises three dimensional (3-D) dove tails, formed in accordance with the embodiments which couple with screw mount receptacles of the front plate.

Once assembled to a chassis, the three-piece radio housing performs the same as the one-piece radio housing when exposed to harsh environments. A benefit of the three-piece design, is the fact that over-molded materials and processes have been eliminated, thus allowing for the housing piece parts to be molded from any injection molded material. This provides the opportunity to mold housings that are made from materials that meet specific needs of a customer. For example, heat resistant material can be used for the fire market, or a highly petro chemical resistant material can be used for a refinery market. The three-pieces being made from injection molded materials allows for the radio housing to be made of different colors, for example one color for the first injection molded part, and a second color for the second injection molded part, and a third color for the third injection molded part.

FIG. 1A is a housing a portable radio, such as a two-way public safety radio, in accordance with some embodiments. Radio housing 100 is formed of three individual piece parts comprising a front plate 102, a first side plate 104 and a second side plate 106. For the purposes of this application, only three housing piece parts are described as the back of the radio is made of a speaker grille and is thus not part of the invention. In accordance with the various embodiments, the front plate 102, the first side plate 104 and the second side plate 106 are made of injection molded material without an overmolded material.

The first side plate has a push-to-talk (PTT) aperture 140 formed therein. Additional apertures, such as for volume up/down and others may also be formed within the side plates. Unlike typical public safety radios which utilize a single, external radio housing made of an injection molded polymer material and then an overmolded polymer material, the radio housing 100 is formed of three pieces of injection molded material which are coupled together in accordance with embodiments to be described herein. The coupling is provided with sufficient tolerance that the three pieces can be uncoupled as well. In accordance with the embodiment, the tolerances can be designed and checked prior to any mounting of the housing components to a radio chassis.

By eliminating the overmold materials and processes, which involve very high pressures and high temperatures, the choice of materials for the injection molded polymer is expanded thereby providing for increased customization of the radio housing 100. For example, if unique material property is required, such as high temperature resistance, then injection molded piece parts of certain nylon copolymer materials are able to be used. The injection molded material may be, for example, a nylon copolymer with injection molding grades with 20-60% by weight glass fiber. An example of such a material is Grivory® GV-4H having a classification of Nylon 66+Nylon 6I/X. In accordance with some embodiments, the front plate 102, and first and second side plates 104, 106 may be made of different injection molded materials having different chemical properties.

Figure 1B:
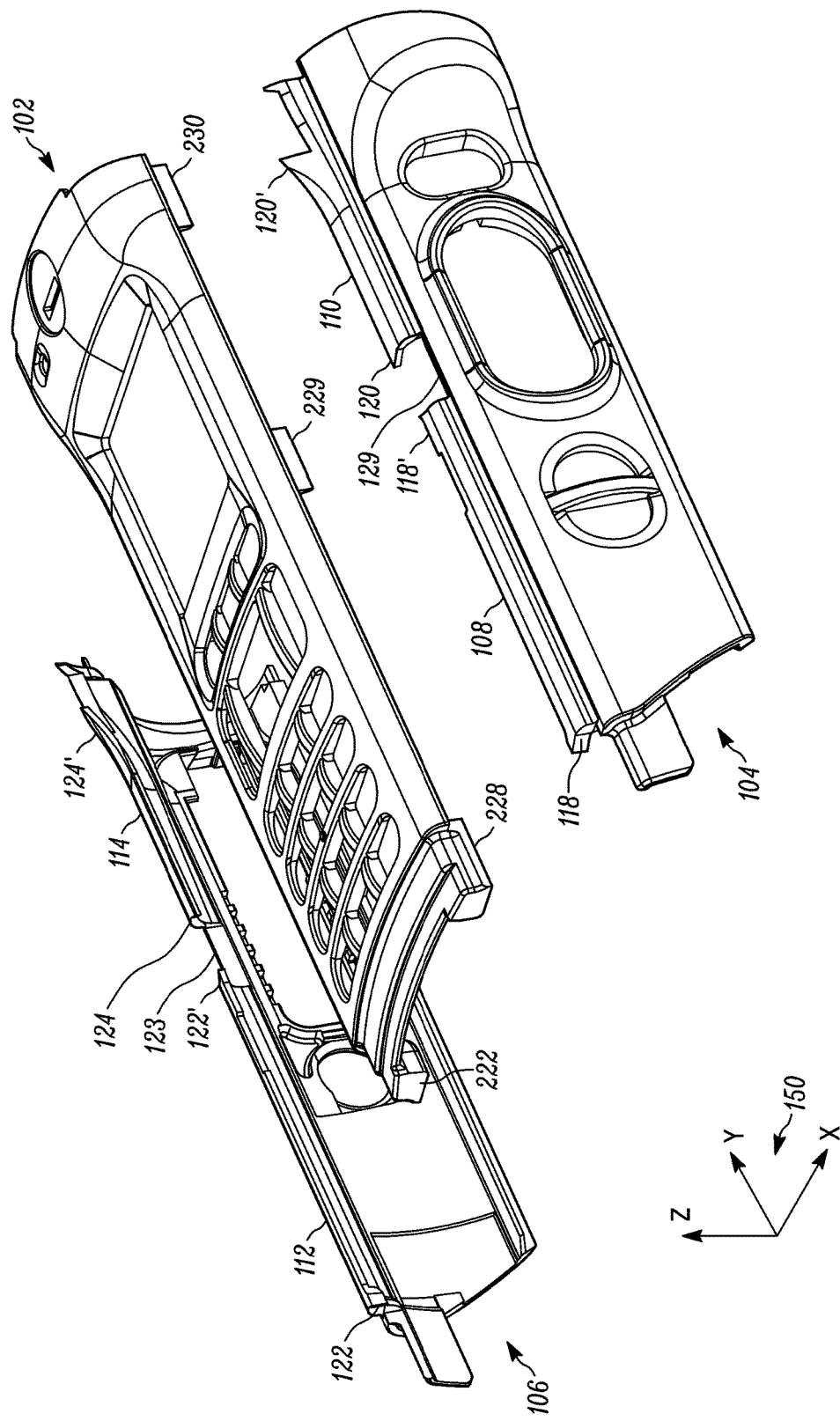
FIG. 1B is an exploded view of the radio housing assembly in accordance with some embodiments.

FIG. 1B is an exploded view of the radio housing 100 in accordance with some embodiments. In accordance with some embodiments, the first and second side plates 104, 106 are formed of a plurality of non-symmetrical, three-dimensional (3-D), dovetails for aligning and coupling to the front plate 102. The first side plate 104 comprises a first dovetail section 108 and a second dove tail section 110 with a gap 129 formed therebetween. The second side plate 106 comprises a third dovetail section 112 and a fourth dove tail section 114 with a gap 123 formed therebetween.

Referring to the first side plate 104, the first dovetail section is three-dimensional (3-D), non-symmetrical and curved along a lengthwise edge (y-axis) 150. The second dove tail section 110 is also three-dimensional, non-symmetrical and curved along the same lengthwise edge (y-axis) of the first side plate 150.

Six screw mount receptacles, of which four are shown in FIG. 1B, are located along interior edges of front plate 102 as screw mount receptacles 222, 228, 229, and 230.

Referring to the second side plate 106, the third dove tail section 112 is three-dimensional (3-D), non-symmetrical and curved along a lengthwise edge (y-axis) 150 of the second side plate. The fourth dovetail section 114 is three-dimensional (3-D), non-symmetrical and curved along the same lengthwise edge (y-axis) 150 of the second side plate.

Each dovetail section 108, 110, 112, 114 comprises first and second hooks, each hook for aligning with and capturing with a respective screw mount receptacle of the front plate 102. First dovetail section 108 comprises first and second hooks 118, 118'. Second dovetail section 110 comprises first and second hooks 120, 120'. Dovetail section 112 comprises first and second hooks 122, 122'. Dovetail section 114 comprises first and second hooks 124, 124'. In accordance with some embodiments, each hook aligns with and captures a screw mount receptacle of the front plate 102.

In accordance with the embodiments, the first gap 129 located between the first and second dovetail sections 108, 110 captures the fourth screw mount receptacle 229 between hooks 118' and 120. The second gap 123 located between the third and fourth dovetail sections 112, 114 captures the third screw mount receptacle (shown in other views by designator 223) between hooks 122', 124. The outer screw mounts of front plate 102, on the other hand, need only be captured by a single hook. For example, hook 118 of first dovetail section 108 captures first screw mount 228, while hook 120' of second dovetail section 110 captures screw mount receptacle 230. Similar mounting is made on the opposite side, such as hook 122 of dovetail section 112 capturing screw mount receptacle 222 and remaining screw mounts shown in other views.

The first and second side plates 104, 106 are coupled to the front plate 102 with predetermined tolerances which facilitate eventual mounting to a radio chassis. The fit and tolerance can thus be verified prior to any assembly to a radio chassis.

Figure 2:
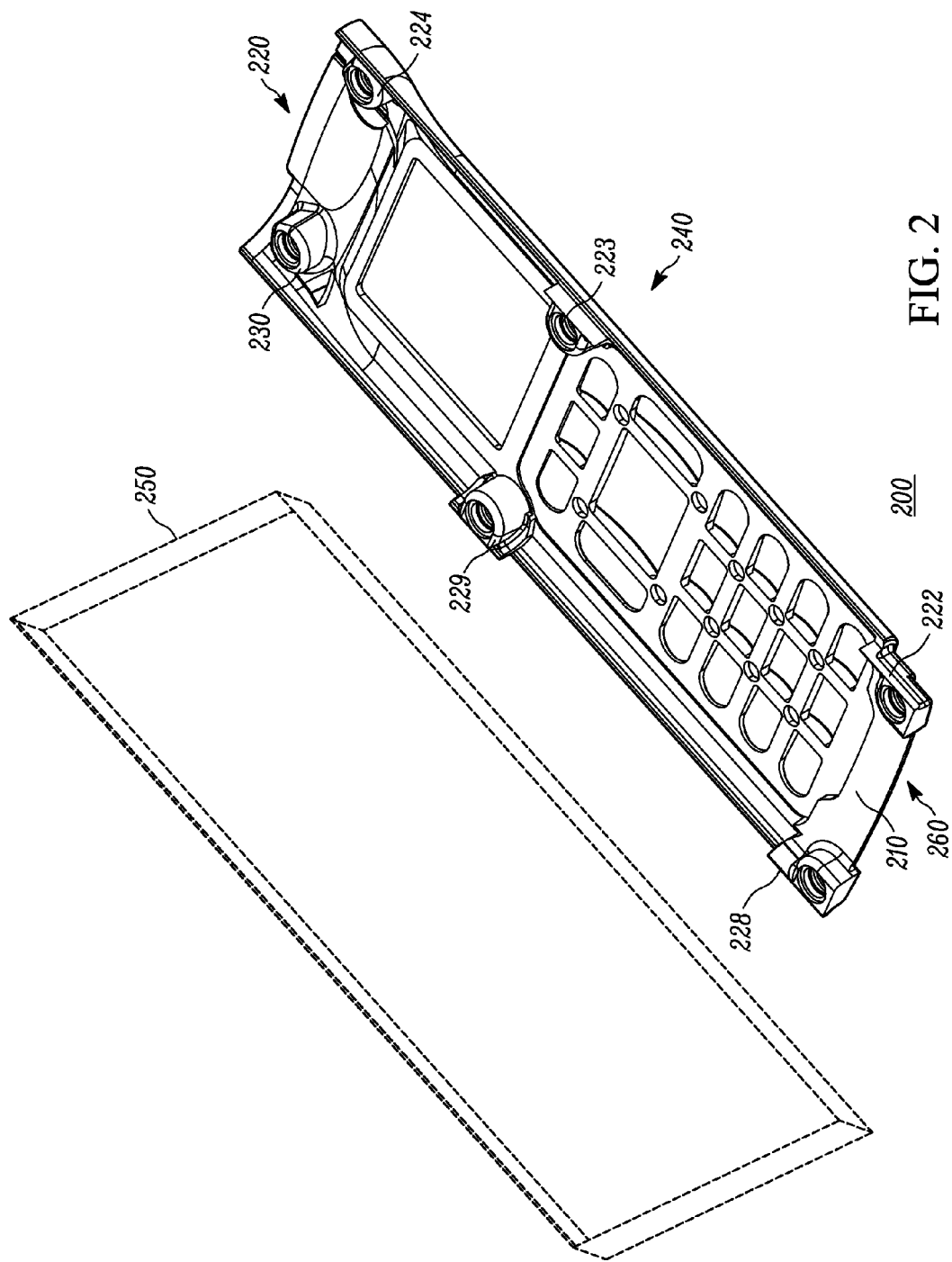
FIG. 2 is a front plate of the housing in accordance with some embodiments.

FIG. 2 shows an interior surface 210 of front plate 102 of the housing 100 in accordance with some embodiments. The front plate 102 is formed of an injection molded material without any overmolded material. The front plate 102 comprises six screw mount receptacles 222, 223, 224, 228, 229, and 230 located on the interior surface 210. First and second screw mount receptacles 224, 230 are located at a top section 220, third and fourth screw mount receptacles 223, 229 are located at a mid-section 240, and fifth and sixth screw mount receptacles 222, 228 are located at a bottom section 260 of the interior surface. The six screw mount receptacles 222, 223, 224, 228, 229, and 230 are used to couple the front plate 102 to a radio chassis 250 via screws (not shown). The side plates 104, 106 are simultaneously coupled to the front plate 102. In accordance with the embodiments, the three pieces 102, 104, 106 of the radio housing 100 can be assembled together without the chassis 250 to verify proper interconnect and fit between the piece parts. Thus, the ability to couple and uncouple the housing 100 prior to assembly to a chassis is highly advantageous as individual piece parts can be verified and replaced if needed. Additionally, if a customer desires to change a housing configuration, such as to change to a different color, the use of interchangeable parts allows the change to be made retroactively.

Figure 3:
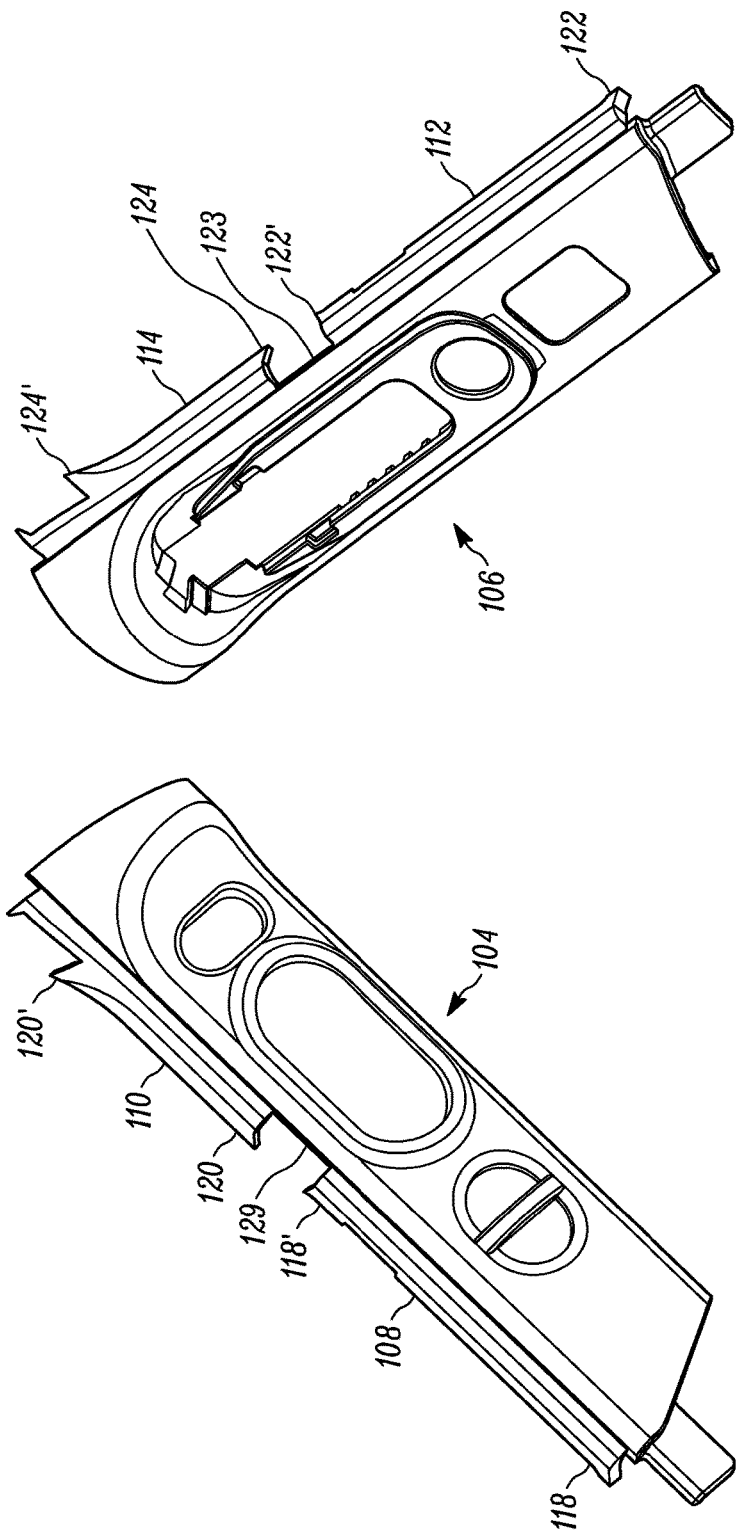
FIG. 3 shows first and second side plates of the housing assembly in accordance with some embodiments.

FIG. 3 shows first and second side plates in accordance with some embodiments. Referring to the first side plate 104, the first dove tail section 108 is longer than the second dove tail section 110. Referring to second side plate 106, the third dove tail section 112 is longer than the fourth dove tail section 114. The first dove tail section 108 on the first side plate 104 is the same length as the third dove tail section 112 on the second side plate 106. The second dove tail section 110 on the first side plate 104 is the same length as the fourth dove tail section 114 on the second side plate 106. In accordance with some embodiments, the use of dovetails of different lengths helps facilitate alignment and minimize errors in assembly.

Figure 4:
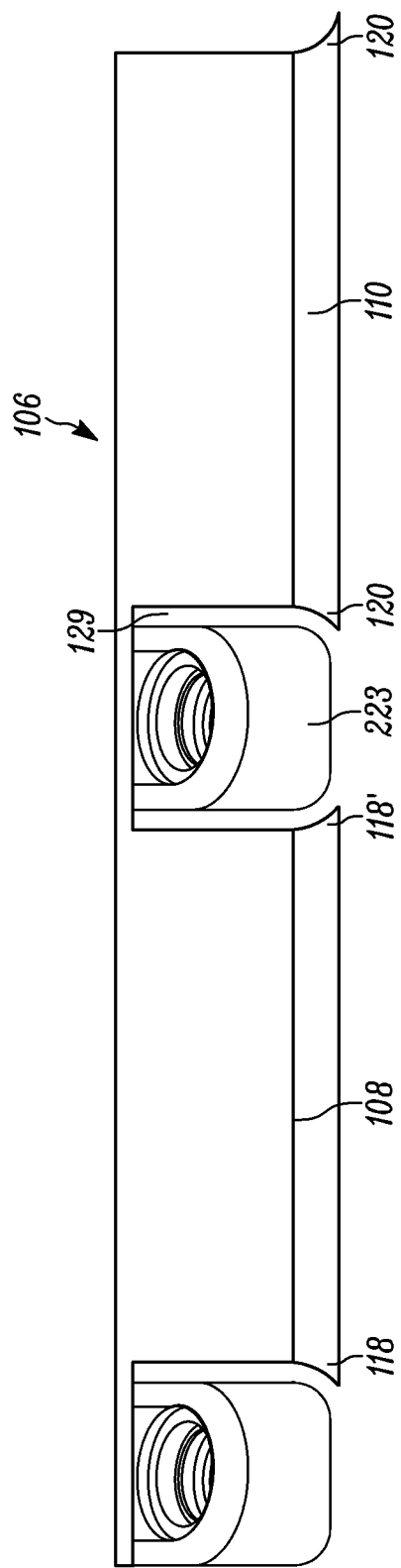
FIG. 4 mating between one of the side plates and a screw mount receptacle in accordance with some embodiments.

FIG. 4 shows the retaining fit between one of the side plates and a screw mount receptacle in accordance with some embodiments. In this view, first side plate 104 having first and second dovetail sections 108 and 110 is shown coupled to screw mount receptacle 223. In accordance with some embodiments, the hooks 118' and 120 on either side of gap 129 capture and couple to the screw mount 229. Although not shown, second side plate 106 similarly captures and couples to the screw mount receptacle 223 via hooks 122' and 124 on either side of gap 123. Thus, the middle screw mounts 223, 229 are each captured by two hooks. The middle screw mounts 223, 229 being captured and coupled into place provides alignment for the remainder of the screw mount receptacles and hooks. The outer screw mounts need only be captured and coupled by a single hook. For example, hook 118 couples to screw mount receptacle 228, and hook 122 couples to screw mount receptacle 222. Similarly, hook 124' couples to screw mount receptacle 224, and hook 120' couples to screw mount receptacle 230. Hence, the three pieces can be coupled together. The coupling is provided with sufficient tolerance that the three pieces can be uncoupled as well.

Assembly of the three pieces 102, 104, 106 to a radio chassis, such as radio chassis 250 of FIG. 2, is accomplished by securing the front plate 102 via the screw mounts (using a plurality of screws) to the chassis. The side plates 104, 106 are coupled as previously described—without screws and without having to interconnect to the chassis. The tolerance slack between the three pieces is taken up, once mounted to the chassis such that the side plates remain coupled securely in place. The tolerances between the screw mounts and the hooks are taken up when mounted to the chassis. To disassemble, the front plate 102 can be unscrewed and then the slack tolerance returns allowing the side plates 104, 106 to be uncoupled.

Accordingly, there has been provided a radio housing 100 formed of injection molded piece parts without overmolded piece parts. Once assembled, the three-piece radio housing performs the same as the one-piece radio housing when exposed to harsh environments. Housings can now be made from materials that meet specific needs of a customer. For example, heat resistant material can be used for the fire market, or a highly petro chemical resistant material can be used for a refinery market. The three-pieces being made from injection molded materials allows for the radio housing to be made of different colors which can be changed retroactively if desired.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A housing assembly for a portable radio, comprising:
   three individual piece parts comprising a front plate, a first side plate and a second side plate;
   the front plate having six screw mount receptacles located on an interior surface, wherein first and second screw mount receptacles are located at a top section, third and fourth screw mount receptacles are located at a mid-section, and fifth and sixth screw mount receptacles are located at a bottom section of the interior surface;
   the first side plate having a push-to-talk (PTT) aperture and having a first dove tail section, the first dove tail section being three-dimensional, non-symmetrical and curved along a lengthwise edge (y-axis), and a second dove tail section, the second dove tail section being three-dimensional, non-symmetrical and curved along the same lengthwise edge (y-axis) of the first side plate, and
   a first gap formed between the first dove tail section and the second dove tail section along the lengthwise edge (y-axis) of the first side plate, the first and second dove tail sections being located between the front plate and first side plate;
   the second side plate having a third dove tail section, the third dove tail section being three-dimensional, non-symmetrical and curved along a lengthwise edge (y-axis) of the second side plate, and a fourth dove tail section, the fourth dove tail section, the fourth dove tail section being three-dimensional, non-symmetrical and curved along the same lengthwise edge (y-axis) of the second side plate, and a second gap formed between the third dove tail section and the fourth dove tail section along the lengthwise edge (y-axis) of the second side plate, the third and fourth dove tail sections being located between the front plate and second side plate;
   and the first gap between the first and second dove tail sections for capturing the third screw mount receptacle; and the second gap between the third and fourth dove tail sections for capturing the fourth screw mount receptacle.

2. The housing assembly of claim 1:
   wherein each dove tail section comprises first and second hooks, each hook for aligning with and capturing a screw mount of the front plate.

3. The housing assembly of claim 1:
   the first dove tail section being longer than the second dove tail section on the first side plate; and
   the third dove tail section being longer than the fourth dove tail section on the second side plate.

4. The housing assembly of claim 3, wherein:
   the first dove tail section on the first side plate being same length as the third dove tail section on the second side plate; and
   the second dove tail section on the first side plat being the same length as the the fourth dove tail section on the second side plate.

5. The housing assembly of claim 1, wherein the front plate and first and second side plates are made of injection molded material without an overmold material.

6. The housing assembly of claim 1, wherein the front plate and first and second side plates are made of different injection molded materials having different chemical properties.

7. The housing assembly of claim 1, wherein the front plate and first-and second side plates are different colors.

8. The housing assembly of claim 1, wherein the front plate is securable to a chassis via the screw mounts, and the first and second side plates are securable to the front plate without having to interconnect to the chassis.

9. The housing assembly of claim 1, wherein tolerance slack between the front plate and the first and second side plates is taken up, once mounted to a chassis, and tolerances between the screw mounts and the chassis are taken up when mounted to the chassis.

10. The housing assembly of claim 1, wherein each dove tail section comprises first and second hooks, each hook for aligning with and capturing a screw mount of the front plate, the first, second, third and fourth dove tail sections of the first and second side plates thereby capturing all six screw mount receptacles of the front plate.

11. The housing assembly of claim 1, wherein the three piece parts couple and uncouple for verification of design tolerances prior to mounting on a portable radio chassis.

12. The housing assembly of claim 1, wherein the three piece parts assemble and disassemble without a chassis to verify proper interconnect and fit between the three piece parts.

13. The housing assembly of claim 1, wherein the first and second side plates mount to a portable radio chassis and then the front plate is screwed to the portable radio chassis.

14. A two-way radio housing, comprising: three individual piece parts comprising a front plate, a first side plate and a second side plate; and
    the front plate having screw mount receptacles and first and second side plates, the first and second side plates having a plurality of non-symmetrical, three-dimensional (3-D), dovetails for aligning and coupling to screw mount receptacles of the front plate, and wherein the front plate and first and second side plates are formed of an injection molded thermoplastic material without an overmolded material; and wherein the plurality of non-symmetrical, 3-D, dovetails comprise:
    a first dove tail section and a second dove tail section formed on the first side plate with a gap formed therebetween, the first dove tail section being longer than the second dove tail section, the first and second dove tail sections being located between the front plate and the first side plate;
    a third dove tail section and a fourth dove tail section formed on the second side plate with a gap formed therebetween, the third dove tail section being longer than the fourth dove tail section, the third and fourth dove tail sections being located between the front plate and the second side plate;
    the first dove tail section on the first side plate being same length as the third dove tail section on the second side plate; and
    the second dove tail section on the first side plat being the same length as the fourth dove tail section on the second side plate.

15. The two-way radio housing of claim 14, wherein one of the first and second side plates has a push-to-talk (PTT) aperture formed therein.

16. The two-way radio housing of claim 14, wherein the injection molded thermoplastic material comprises an injection molded thermoplastic polymer.

17. The two-way radio housing of claim 14, wherein the front plate and first and second side plates are not formed of any overmolded thermoplastic materials.

18. The two-way radio housing of claim 14, wherein two of the screw mount receptacles of the front plate are coupled and retained within corresponding gaps of the first and second side plates.

19. The two-way radio housing of claim 14, wherein the front plate and first and second side plates are made of different injection molded materials having different chemical properties.

20. The two-way radio housing of claim 14, wherein the front plate and first and second side plates are different colors.

21. The two-way radio housing of claim 14, wherein the front plate is securable to a chassis via the screw mounts, and the first and second side plates are securable to the front plate without having to interconnect to the chassis.

22. The two-way radio housing of claim 14, wherein tolerance slack between the front plate and the first and second side plates is taken up, once mounted to a chassis, and tolerances between the screw mounts and the chassis are taken up when mounted to the chassis.

23. The two-way radio housing of claim 14, wherein the three piece parts couple and uncouple for verification of design tolerances prior to mounting on a portable radio chassis.

24. The two-way radio housing of claim 14, wherein the three piece parts assemble and disassemble without a chassis to verify proper interconnect and fit between the three piece parts.

25. The two-way radio housing of claim 14, wherein the first and second side plates mount to a portable radio chassis and then the front plate is screwed to the portable radio chassis.

26. A housing assembly for a portable radio, comprising:
    three individual piece parts comprising a front plate, a first side plate and a second side plate;
    the front plate having a plurality of screw mount receptacles located on side edges of an interior surface;
    the first side plate having a plurality of dove tail sections, the plurality of dove tail sections being three-dimensional, non-symmetrical and curved along a lengthwise edge (y-axis), and
    a first gap formed between at least two dove tails sections along the lengthwise edge (y-axis) of the first side plate, the plurality of dove tail sections of the first side plate being located between the front plate and first side plate;
    the second side plate having a plurality of dove tails sections, the plurality of dove tail sections being three-dimensional, non-symmetrical and curved along a lengthwise edge (y-axis) of the second side plate, and
    a second gap formed between at least two dove tail sections along the lengthwise edge (y-axis) of the second side plate, the plurality of dove tail sections of the second side plate being located between the front plate and second side plate; and
    the first gap for capturing one of the plurality of screw mount receptacles; and
    the second gap for capturing another of the plurality of screw mount receptacles.

27. The housing assembly of claim 26, wherein the front plate and the first and second side plates are made of injection molded material without an overmold material.

28. The housing assembly of claim 26, wherein the first side plate has a push-to-talk (PTT) aperture formed within one of the first and second side plates.

29. The housing assembly of claim 26, wherein the front plate and the first and second side plates are made of different injection molded materials having different chemical properties.

30. The housing assembly of claim 26, wherein the front plate and the first and second side plates are different colors.

31. The housing assembly of claim 26, wherein the front plate and the first and second side plates are for mounting to a radio chassis.

32. The housing assembly of claim 26, wherein the front plate is securable to a chassis via the screw mounts, and the first and second side plates are securable to the front plate without having to interconnect to the chassis.

33. The housing assembly of claim 26, wherein tolerance slack between the front plate and the first and second side plates is taken up, once mounted to a chassis, and tolerances between the screw mounts and the chassis are taken up when mounted to the chassis.

34. The housing assembly of claim 26, wherein the three piece parts couple and uncouple for verification of design tolerances prior to mounting on a portable radio chassis.

35. The housing assembly of claim 26, wherein the three piece parts assemble and disassemble without a chassis to verify proper interconnect and fit between the three piece parts.

36. The housing assembly of claim 26, wherein each of the three piece parts is interchangeable thereby enabling retroactive color changes for the portable radio.

37. The housing assembly of claim 26, wherein the first and second side plates mount to a portable radio chassis and then the front plate is screwed to the portable radio chassis.

* * * * *